United States Patent [19]
Owen et al.

[11] Patent Number: 5,995,901
[45] Date of Patent: Nov. 30, 1999

[54] AUTOMATIC VIEW ADJUSTING FLIGHT PLAN DISPLAY

[75] Inventors: Gary L. Owen, Robins; James M. Suiter; Jeff M. Henry, both of Cedar Rapids, all of Iowa

[73] Assignee: Rockwell International Corporation, Costa Mesa, Calif.

[21] Appl. No.: 08/723,405

[22] Filed: Sep. 30, 1996

[51] Int. Cl.[6] .................................................. G06F 165/00
[52] U.S. Cl. ............................... 701/202; 701/4; 340/974
[58] Field of Search .............................. 701/3, 4, 14, 15, 701/16, 200, 202, 206; 340/945, 971, 974; 244/175; 73/178 R

[56] References Cited

U.S. PATENT DOCUMENTS

| | | | |
|---|---|---|---|
| 4,642,775 | 2/1987 | Cline et al. ............................... | 701/202 |
| 4,792,906 | 12/1988 | King et al. ............................... | 701/206 |
| 4,811,230 | 3/1989 | Graham et al. ........................... | 701/15 |
| 5,041,982 | 8/1991 | Rathnam ................................. | 701/200 |
| 5,340,061 | 8/1994 | Vaquier et al. .......................... | 244/175 |
| 5,420,582 | 5/1995 | Kubbat et al. ........................... | 340/974 |
| 5,445,021 | 8/1995 | Cattoen et al. ......................... | 73/178 R |
| 5,797,106 | 8/1998 | Murray et al. .......................... | 701/206 |

*Primary Examiner*—Gary Chin
*Attorney, Agent, or Firm*—Kyle Eppele; James P. O'Shaughnessy

[57] ABSTRACT

An FMS with the capability of automatically adjusting the view of the flight path as the flight progresses while maintaining a set viewing direction. The vertical dimension of the flight path display chosen to fill the display and provide increased readability.

15 Claims, 7 Drawing Sheets

AUTOMATIC VIEW ADJUSTING FLIGHT PLAN DISPLAY

CROSS REFERENCE TO RELATED APPLICATIONS

This application relates to allowed U.S. Pat. application Ser. No. 08/724,533, filed Sep. 30,1996, now allowed, entitled A FLIGHT MANAGEMENT SYSTEM WITH 3-DIMENSIONAL FLIGHT PATH DISPLAY, by James M. Suiter and Gary L. Owen, which is incorporated herein by this reference.

FIELD OF THE INVENTION

The present invention generally relates to flight management systems (FMSs) and more particularly to FMSs with vertical flight path displays and a novel 3-dimensional flight path display and even more particularly relates to automatically adjusting views for such flight plan displays.

BACKGROUND

In recent years, avionics engineers have endeavored to provide pilots and flight crews with the information necessary for safe flight. One approach has been to provide the flight crew with a constantly updated flight plan display as the flight progresses.

While this approach does have several beneficial aspects, it has several shortcomings. A purely mechanistic approach in which the display is constantly being totally rewritten can result in confusing or hard to read displays, especially during times of performing maneuvers which are dramatic with respect to the earlier segment of the flight.

Consequently, there exists a need for an improved system for displaying flight path information.

SUMMARY OF THE INVENTION

It is an object of the present invention to provide a enhanced FMS with reduced requirements of attention by the flight crew.

It is a feature of the present invention to include a 3-dimensional display of a flight path, which, during maneuvers, maintains a predetermined orientation of the view direction with respect to the flight plan.

It is an advantage of the present invention to reduce the requirement of a flight crew to mentally readjust to a new view angle orientation.

It is another feature of the present invention to include an automatic vertical scale adjustment.

It is another advantage of the present invention to provide enhanced readability of the vertical dimensions on a wide variety of flight plan segments.

The present invention is an FMS with enhanced abilities to calculate, display and advise the flight crew of flight path information which is designed to satisfy the aforementioned needs, provide the previously stated objects, include the above listed features, and achieve the already articulated advantages. In the present invention, the work load on a flight crew can be reduced and the situational awareness enhanced by providing a display of information which is easier to interpret.

Accordingly, the present invention is an FMS which includes a feature therein of generating a representation of a flight plan, having automatic view adjustments.

BRIEF DESCRIPTION OF THE DRAWINGS

The invention may be more fully understood by reading the following description of a preferred embodiment of the invention, in conjunction with the appended drawings wherein.

DETAILED DESCRIPTION

Figure 1:
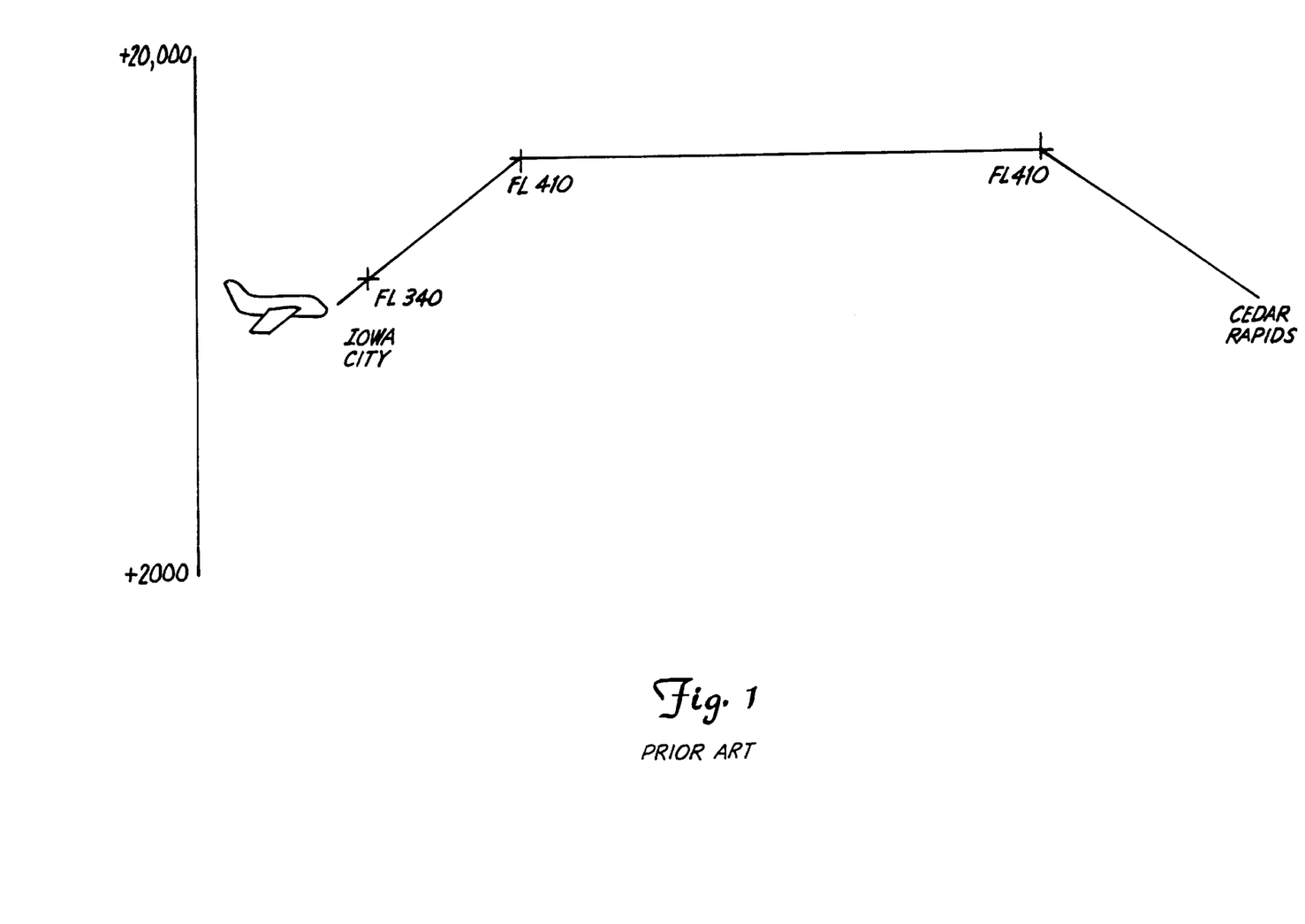
FIG. 1 a view of a typical 2-dimensional side representation of flight plan information of the prior art, which does not include an auto scaling function.

Now referring to the drawings, where like numerals refer to like matter throughout, and more particularly to FIG. 1 there is shown a two dimensional plan view of a flight plan from Iowa City to Cedar Rapids, which is typical of prior art FMSs. The vertical dimension is shown at the same scale throughout the flight. Typically the flight plan data moves up and down, as the aircraft climbs or descends, but remains within plus or minus 20,000 feet of the actual aircraft altitude.

Figure 2A:
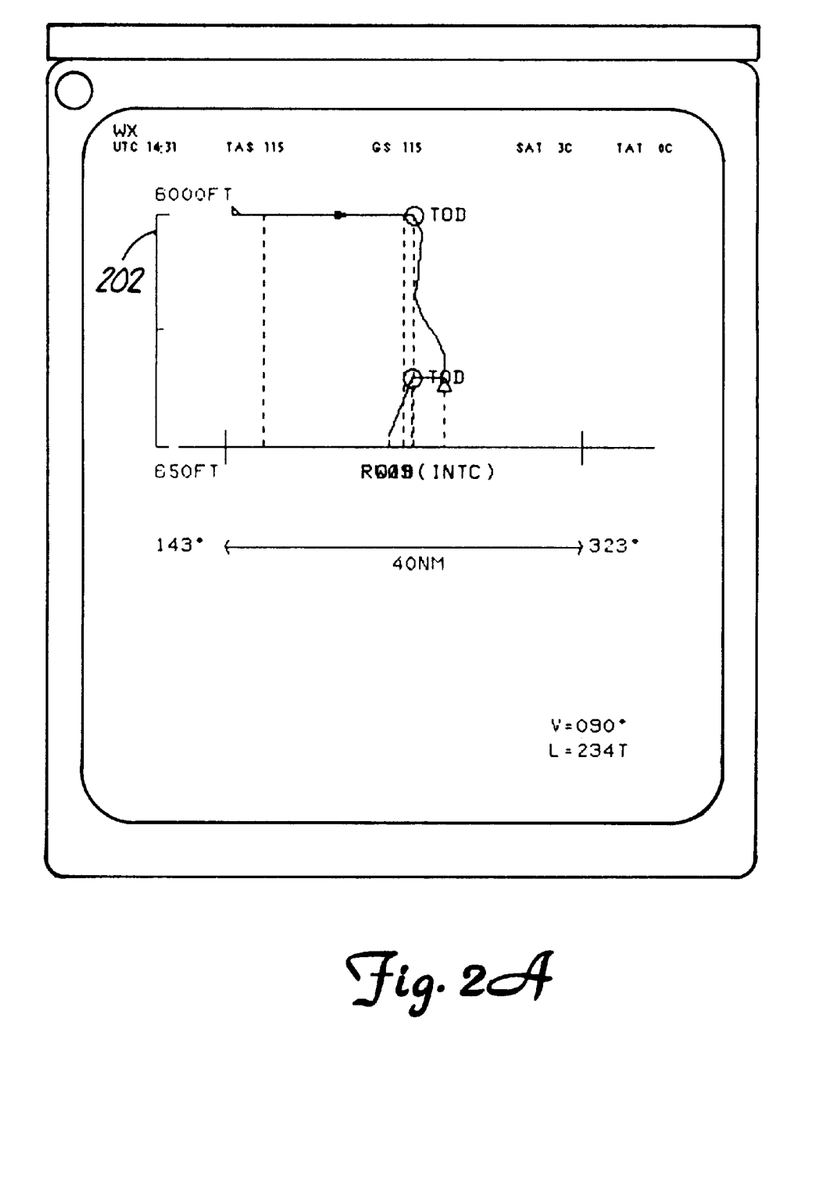
FIG. 2A is a view of a 2-dimensional side representation of flight plan information of the present invention which includes an autoscaling function, with a display ceiling of 6000 feet.

Now referring to FIG. 2A, there is shown a two dimensional side view, generally designated 200, of a flight plan from Iowa City to Cedar Rapids, of the present invention, which has an auto scaling feature with a vertical dimension which generally fills up the vertical area of the display. The scale 202 shown on the left side of the display shows a flight plan segment at 6000 feet. In general, the scale 202 can have variable ranges. E.g. for short distance flight plans the maximum altitude might be 5000 feet and while cruising a range of 40,000 feet might be used. Since the viewing area of the display is fixed, the ability to resolve the vertical nature of the flight plan details is increased when the scale 202 displays a lower ceiling. Optimally, the scale 202 is chosen to be as small as possible and still show the highest point of the flight plan within the horizontal range being displayed.

Figure 2B:
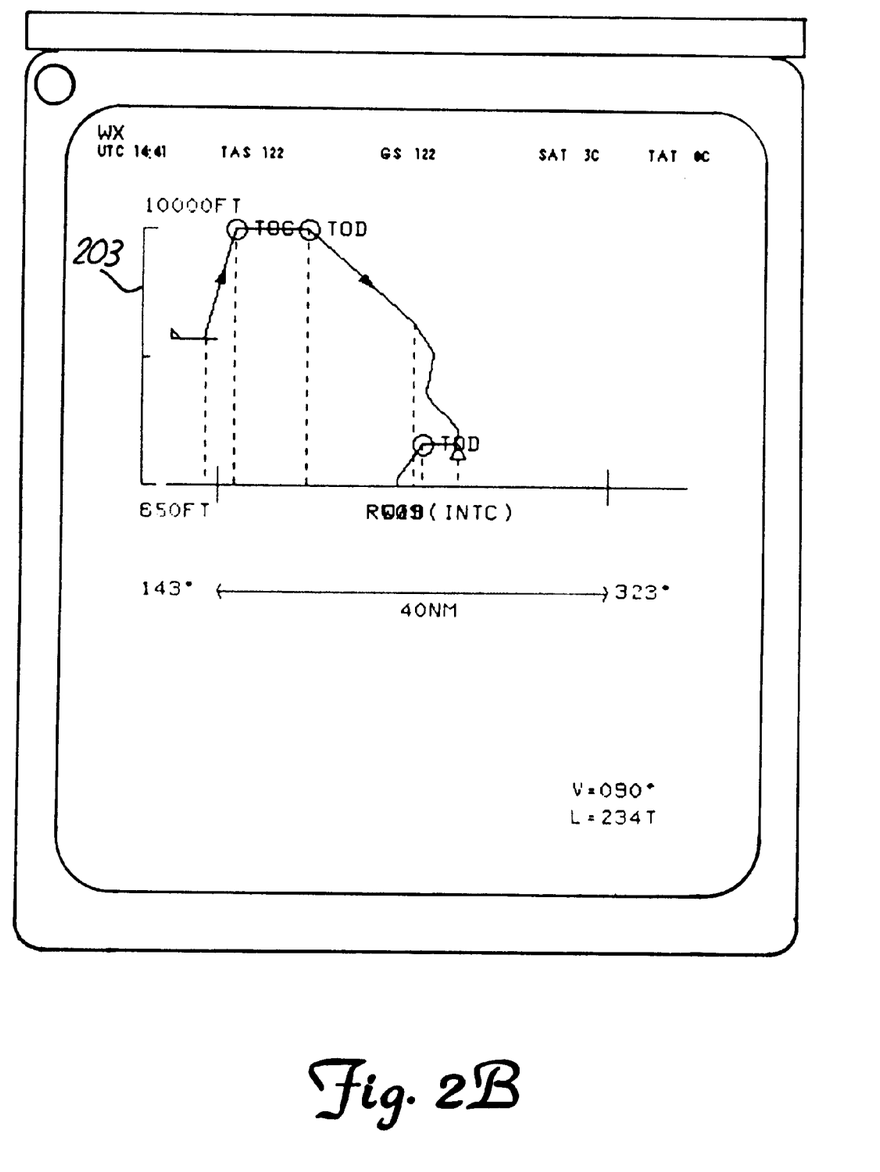
FIG. 2B is a view of a 2-dimensional side representation of flight plan information of the present invention which includes an autoscaling function, with a display ceiling of 10,000 feet.

Now referring to FIG. 2B, there is shown a two dimensional side view, generally designated 201, of a flight plan this is similar to view 200 of FIG. 2A except that scale 203 has been changed to show an ascent to 10,000 feet to that the scale 203 shows a 10,000 feet ceiling in the same viewing area as a 6000 feet ceiling was shown in FIG. 2A.

Figure 3:
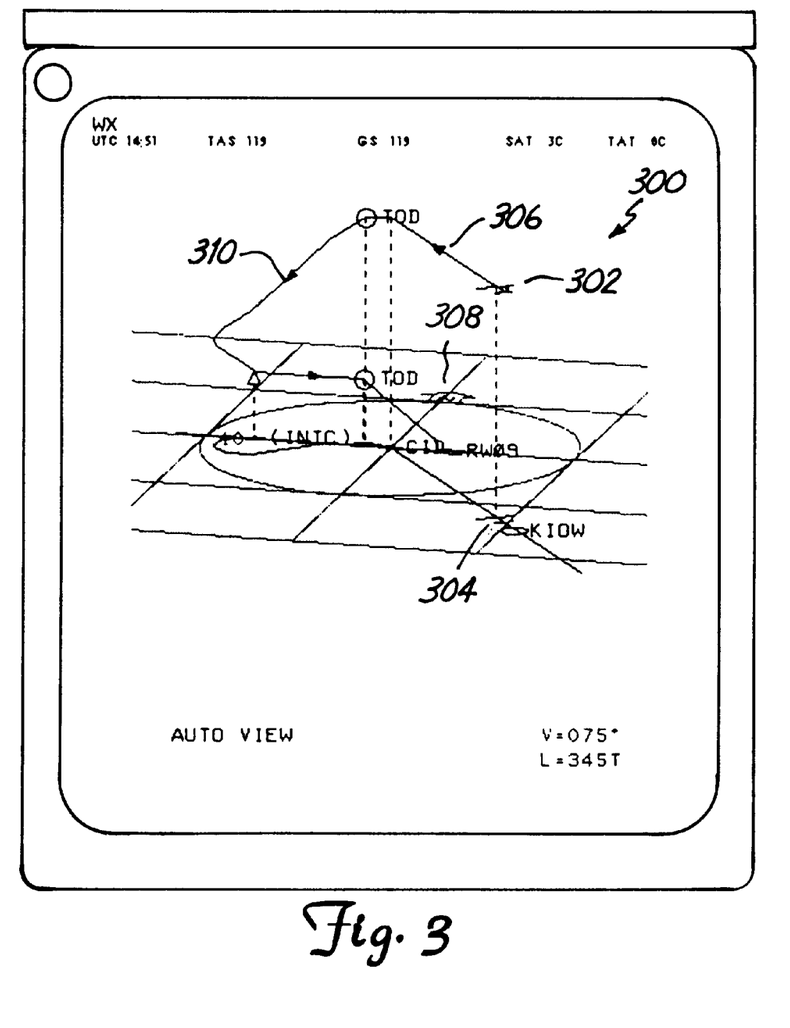
FIG. 3 is 3-dimensional view of flight plan information in accordance with the present invention, with the aircraft at a first point and a set viewing direction.

Now referring to FIG. 3, there is shown three dimensional view, generally designated 300, from a viewing direction above, behind and to the left of the flight plan segment being currently flown by the aircraft. The aircraft is shown at point above the ground at 302. Point 302 is projected onto the ground at point 304. The aircraft is flying along flight segment 306. The view direction is at 75 degrees inclined from a straight down view, which would be a 0 degree vertical viewing direction. The 0 degree viewing direction will provide a 2-dimensional plan view, which might be called a "God's eye view." The lateral reference viewing direction is 345 degrees or 15 degrees west of north. Pointer 308 depicts a direction of 360 degrees or due north. As the aircraft continues along its flight plan and along segment 306 it will eventually reach the end of segment 306 and will need to make a turn to the left and proceed down along segment 310. When pilots make such maneuvers the orientation of the aircraft and the view displayed to the crew are rapidly changing. These rapid changes could, at times, be difficult to follow when viewed on a typical display. Consequently, it is desirable to provide a slow or intentionally retarded transition between such changes.

Now referring to FIG. 4, there is shown another three dimensional view, generally designated 400 of a later portion of the flight plan shown in FIG. 3 in which the aircraft has move along the flight path and is currently flying along segment 310. View 400 is drawn from a point in the same relative direction from the current flight plan segment as in FIG. 3. In other words the views in FIG. 3 and FIG. 4 might be referred to as "Guardian Angel views" in the sense that the views show what someone constantly remaining over the pilot's left shoulder would see. View 400 has changed to a lateral reference view of 292 degrees or 68 degrees west of north, while maintaining the same relative viewing angle with respect to the flight plan course. This constant relative viewing angle is believed to aid pilots and other flight crew members in rapidly adjusting to a new display after a relatively dramatic maneuver.

Figure 5:
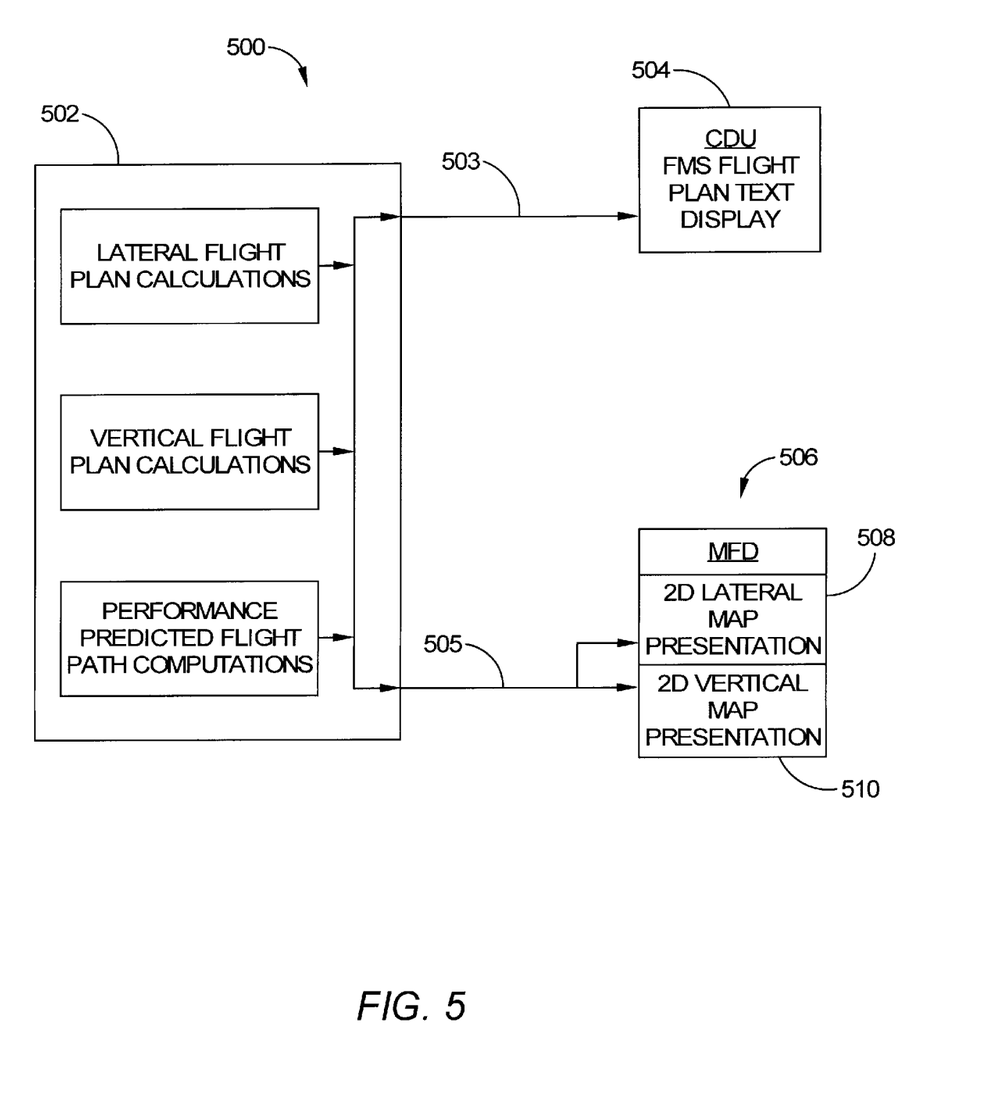
FIGS. 5 and 6 are block diagrams of flight management systems operable to embody the present invention.

Referring now to FIG. 5, there is shown a block diagram of an exemplary flight management system (FMS) generally designated 500, operable to embody two-dimensional flight plan displays in accordance with the present invention, such as shown and described herein by way of reference to FIGS. 2A and 2B. Flight management system computer (FMSC) 502 performs lateral, vertical, and performance predicted flight plan computations in a well-known fashion. Coupled to FMSC 502, via digital data bus 503, is control display unit (CDU) 504, which performs the functions of input/output of flight plan text information. Lateral, vertical, and predicted flight path data used for text format is shared between CDU 504 and FMSC 502. A multifunction display (MFD) 506 is shown coupled via digital data bus 505, to and sharing lateral, vertical, and predicted flight path data used for graphical format with the FMSC 502. The MFD 506 is divided into a two-dimensional lateral map presentation segment 508 and a two-dimensional vertical map presentation segment 510. FMS 500 of FIG. 5 is very similar to incorporated FIG. 1A of U.S. application Ser. No. 08/724,533, except for software contained in a processor of the FMSC 502 or a processor in the display 506 for providing the auto scaling feature in accordance with the present invention.

Figure 4:
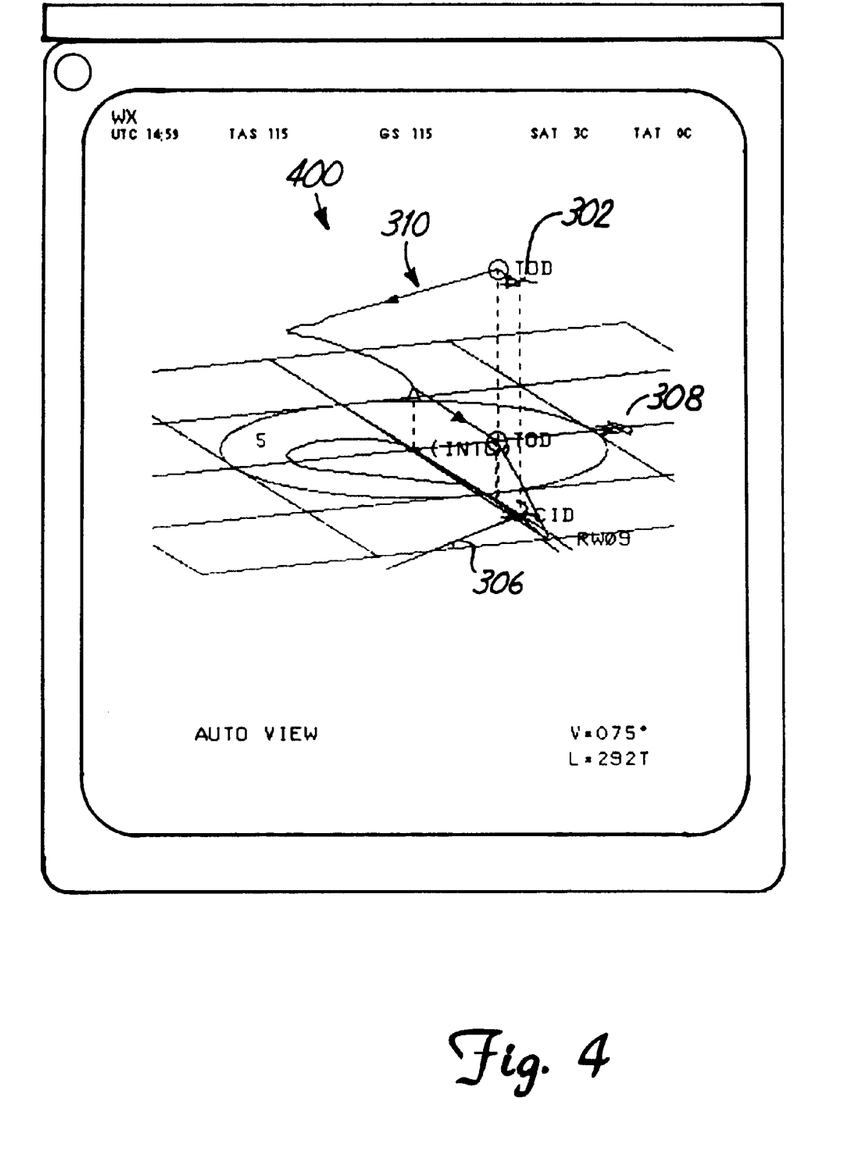
FIG. 4 is another 3-dimensional view of the flight plan information of FIG. 3, but from a different position along the flight path while maintaining the same set viewing direction.
Figure 6:
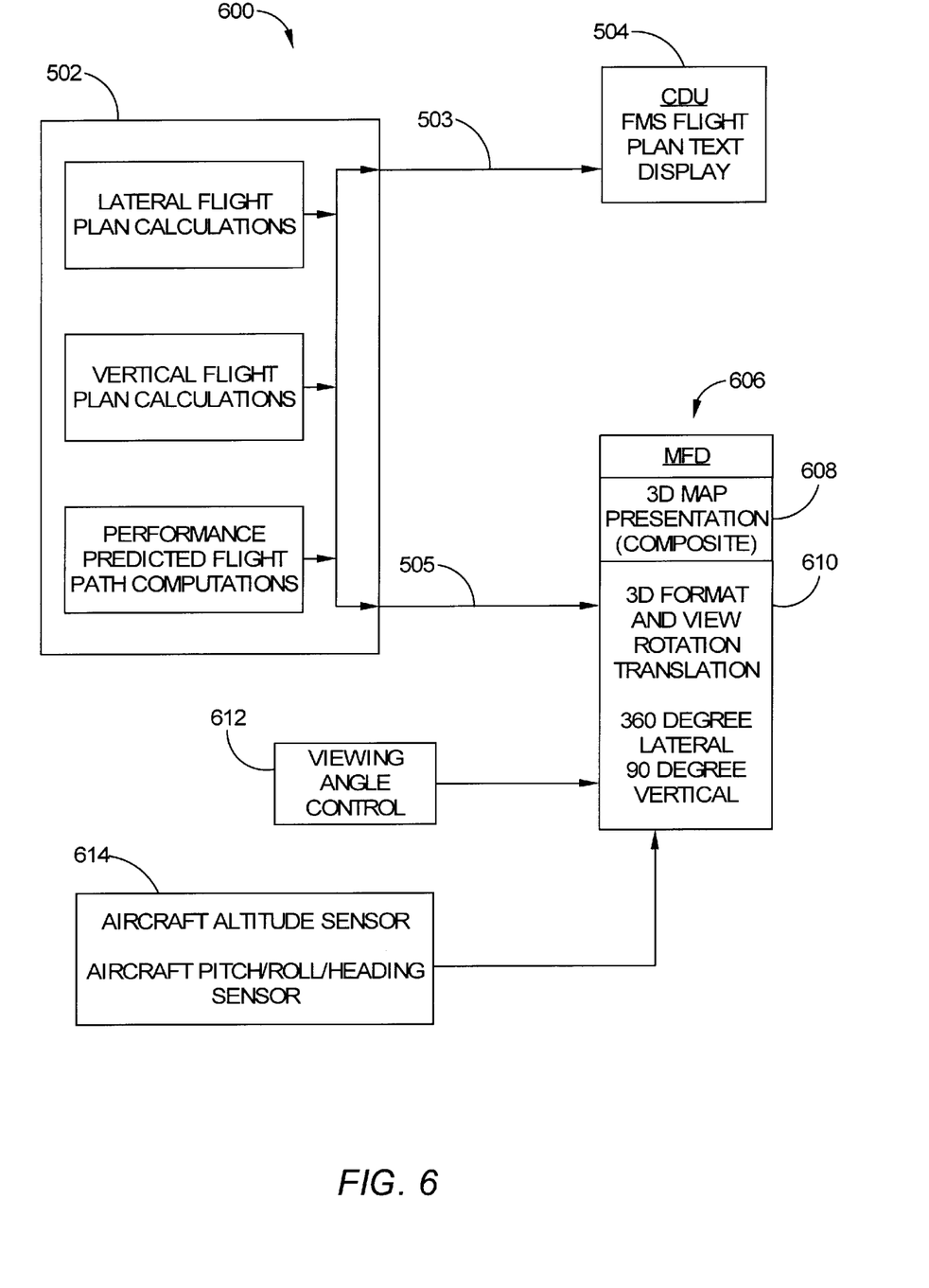

Referring now to FIG. 6, there is shown a block diagram of an exemplary flight management system (FMS) generally designated 600, operable to embody three-dimensional flight plan displays in accordance with the present invention, such as shown and described herein by way of reference to FIGS. 3 and 4. Items numbered 502, 503, 504, and 505 of FIG. 5 also appear in FIG. 6. Also shown is a multifunction display 606 which is very similar to MFD 506, except for software contained therein for presentation and manipulation of three-dimensional views as shown in FIGS. 3 and 4 above. Display 606 may further contain an interface for coupling with view angle control 612 and aircraft altitude sensor and aircraft pitch/roll/heading sensor 614. Control 612 is preferably a joystick, mouse, or other similar well-known controller. Sensors 614 are well known in the art. FMS 600 of FIG. 6 is very similar to incorporated FIG. 1B of U.S. application Ser. No. 08/724,533, except for software contained in a processor of the FMSC 502 or a processor in the display 606 for providing a constant relative viewing angle feature in accordance with the present invention.

In operation, the FMS is operated in much the same manner and with the same hardware as prior art FMSs except that the flight plan information is updated as the flight progresses in a manner which reduces the need for pilots to become reaclimated to the view each time a course change occurs. The software disclosed in the appendix provides a detailed description of one embodiment of the present invention. The software is written in the ADA programming language which is well known in the art and which is capable of use with many computer processors which are well known in the art. The precise details of software code and hardware design are a matter of designer's choice and are believed to be readily understood and generated by persons skilled in the art.

Now referring to the appendix, there is disclosed a group of source code listings, in the ADA programming language which could be used by a processor in the display or FMSC. The partitioning of software and computational tasks between the numerous elements of system is a matter of individual designer's choice.

It is thought that the FMS, of the present invention, will be understood from the foregoing description and it will be apparent that various changes may be made in the form, construction, steps and the arrangement of the parts and steps, without departing from the spirit and scope of the invention or sacrificing all of their material advantages, the form herein being merely preferred or exemplary embodiments thereof.

APPENDIX (Containing 10 Pages)

---

THIS PROCEDURE DECODES THE ALTITUDE WORD WITH ITS ASSOCIATED CONTROL BITS.

```
procedure Format_Altitude (Word           : in ARINC_429.Message;
                           Bits           : in ARINC_429.BNR_Bit_Count;
                           Start_Index    : in Integer := 8;
                           Chk_Bits_9_10  : in Boolean := false;
                           Alt_Data       : in out
                              Draw_3d.Altitude_Data_Record_Type;
                           Label          : in ARINC_429.Label_Type := 0
                                          ) is FUNCTIONAL DESCRIPTION -  Reads a altitude from the input parameter and
                             formats it at the specified location of the
                             current display line and return decoded optional
                             altitude data if present.
```

```
--|                           3D addition.
--|    LIMITATIONS/NOTES - None.
--|..............................................................................................................................
       Raw_Alt       : System_Types.Integer32;
       Scaled_Alt    : System_Types.Float6;
       Bit_9         : integer32;
       Bit_10        : integer32;
       Bit_11        : integer32;
       color_msg     : String(1..3);
       type_msg      : String(1..6);
begin
       Raw_Alt := ARINC_429.Extract(Word, 12, ARINC_429.Bit_Count(Bits));
       Scaled_Alt := Float6(Raw_Alt);
       Bit_9  := Integer32(ARINC_429.Extract(Word, 9, 1));
       Bit_10 := Integer32(ARINC_429.Extract(Word, 10, 1));
       Bit_11 := Integer32(ARINC_429.Extract(Word, 11, 1));
       if ( not Chk_Bits_9_10 ) then
             if Label = 8#006# then
                   Alt_Data.Elevation_Alt := Units.Feet(Scaled_Alt);
                   Alt_Data.Alt_Spec_Kind := Draw_3d.Elevation;
             else
                   Alt_Data.Alt_Spec_Kind := Draw_3d.General;
                   Alt_Data.General_Alt := Units.Feet(Scaled_Alt);
             end if;
       else
             if    ( ( Bit_9 = 0 ) and ( Bit_10 = 0 ) ) then
                   Alt_Data.Alt_Spec_Kind := Draw_3d.Alt_Computed;
                   Alt_Data.Computed_Alt := Units.Feet(Scaled_Alt);
             elsif ( ( Bit_9 = 0 ) and ( Bit_10 = 1 ) ) then
                   if ( Alt_Data.Alt_Spec_Kind = Draw_3d.Alt_At_Or_Above ) then
                         Alt_Data.Alt_Spec_Kind := Draw_3d.Above_And_Below;
                   else
                         Alt_Data.Alt_Spec_Kind := Draw_3d.Alt_At_Or_Below;
                   end if;
                   Alt_Data.At_Or_Below_Alt := Units.Feet(Scaled_Alt);
             elsif ( ( Bit_9 = 1 ) and ( Bit_10 = 0 ) ) then
                   if ( Alt_Data.Alt_Spec_Kind = Draw_3d.Alt_At_Or_Below ) then
                         Alt_Data.Alt_Spec_Kind := Draw_3d.Above_And_Below;
                   else
                         Alt_Data.Alt_Spec_Kind := Draw_3d.Alt_At_Or_Above;
                   end if;
                   Alt_Data.At_Or_Above_Alt := Units.Feet(Scaled_Alt);
             else
                   Alt_Data.Alt_Spec_Kind := Draw_3d.Draw_Symbol_At_Alt;
                   Alt_Data.Draw_At_Alt := Units.Feet(Scaled_Alt);
             end if;
       end if;
       if ( Bit_11 = 0 ) then
             Alt_Data.Altitude_Symbol_Color := Draw_3d.Green;
       else
             Alt_Data.Altitude_Symbol_Color := Draw_3d.Yellow;
       end if;
       Map_Display_Buffer(Dsp_Index)(Start_Index) := 'A';
       INT_IO.Put(To     =>
                        Map_Display_Buffer(Dsp_Index)(Start_Index+1..Start_Index + 5),
                  Item => Integer32(Scaled_alt));
       if chk_bits_9_10 then
             If     ( Bit_9 = 0 ) and ( Bit_10 = 0 ) then
                   type_msg := "COMPUT";
             elsif ( Bit_9 = 0 ) and ( Bit_10 = 1 ) then
                   type_msg := "BELOW";
             elsif ( Bit_9 = 1 ) and ( Bit_10 = 0 ) then
                   type_msg := "ABOVE";
             else
                   type_msg := "DRAWAT";
             end if;
             Map_Display_Buffer(Dsp_Index)(Start_Index+7..Start_Index+12) := type_msg;
             if ( Bit_11 = 0 ) then
                   color_msg := "GRE";
             else
                   color_msg := "YEL";
             end if;
             Map_Display_Buffer(Dsp_Index)(Start_Index+14..Start_Index+16) := color_msg;
       end if;
   end Format_Altitude;
```

THESE CODE SEGMENTS SHOW 1) HOW THE ELEVATION DATA RECIEVED IS USED
TO ADJUST ALTITUDES ABOVE THE GRID, AND THUS THE GRID ELEVATION;
2) CALULATION OF THE AUTO-SCALING FACTOR, CUR_VERT_SCALE_3D, IS SHOWN;
AND 3) THE 5000 FOOT MINIMUM VERTICAL SCALE (MIN_ALT_FOR_SCALING_3D)
    -- WHEN RECIEVED ELEVATION OF A ARRIVAL OR DEPARTURE AIRPORT

```
-- THAT IS ON THE CLIPPED MAP
when Elevation =>
    Have_Elevation := True;
    Current_Elevation_3d := Float(Alt_Data.Elevation_Alt);
    Elevation_Alt_Valid_3d := True;
    if ( Current_Elevation_3d < Min_Elev_3d) then
        Min_Elev_3d := Current_Elevation_3d;
    end if;
        .
        .
        .
Current_Adj_Altitude_3d := Current_Altitude_3d - elevation_trans;
if    ( Current_Adj_Altitude_3d > Adj_Max_Alt_3d ) and
      ( Current_Adj_Altitude_3d > Min_Alt_For_Scaling_3d ) then
    Adj_Max_Alt_3d := Current_Adj_Altitude_3d;
end if;
        .
        .
        .
-- set up vertical scale from max altitude in last pass
if ( Adj_Max_Alt_3d <= 0.0 )
then
    Cur_vert_scale_3d := 0.005;
    Max_Adj_Alt_In_Use := Units.Feet(Min_Alt_For_Scaling_3d);
    Max_Baro_Alt_In_Use := Units.Feet(Min_Alt_For_Scaling_3d);
else
    Cur_vert_scale_3d :=   (    Long_Float(Display_Center_Y) /
                                Long_Float(Adj_Max_Alt_3d)
                           )*
                           Long_Float(0.8);
    Max_Adj_Alt_In_Use := Units.Feet(Adj_Max_Alt_3d);
    Max_Baro_Alt_In_Use := Units.Feet(Max_Baro_Alt_3d);
end if;
```
THE FOLLOWING CODE FRAGMENT AND PROCEDURE SHOW THE AUTO VIEW
FUNCTIONALITY BASED ON INBOUND COURSE OF THE MAP CENTER.
```
    -- time dependent auto rotate
    -- executed every 1/20 second
    Angle_3d_About_Z := norm_angle(Angle_3d_About_Z);
    if ( Auto_Rotating ) then
        if ( ( target_auto_angle_delta > 0.0 ) and
             ( cum_auto_angle_delta >= target_auto_angle_delta ) )
           or ( ( target_auto_angle_delta <= 0.0) and
                ( cum_auto_angle_delta <= target_auto_Angle_delta ) )
        then
            Auto_Rotating := False;
        else
            Angle_3d_About_Z := Angle_3d_About_Z + Auto_Z_Delta;
            cum_auto_angle_delta := cum_auto_angle_delta + Auto_Z_Delta;
            Set_Rot_Angle_Data( Rot_X => Angle_3d_About_X,
                                Rot_Z => Angle_3d_About_Z);
            if Graphic_Map then
                Display_Map_Data;
            end if;
        end if;
    end if;
--|..................................................................................................................................
    procedure Set_Map_Ctr_In_Crs(In_Crs : in Units.Long_Radians) is
--|
--| PURPOSE - Sets the map center inbound course and deltas for auto view.
--|      3d addition.
--| LIMITATIONS/EXCEPTIONS - None.
--|..................................................................................................................................
    norm_z_minus_crs    : Units.Radians;
    new_crs             : Units.Radians;
    delta_angle         : Units.Radians;
    begin
        new_crs := Units.Radians(In_Crs);
        if hold_relative_mode and (new_crs /= Last_In_Crs)
        then
            if Map_Ctr_In_Crs.Is_Set then -- not first inbound course spec
                Auto_Rotating := True;
                Auto_Z_Target_Value :=   Angle_3d_About_Z +
                                         (new_crs - Map_Ctr_In_Crs.Value);
                -- set up for 2 second move to new value
                delta_angle := Auto_Z_Target_Value - Angle_3d_About_Z;
                -- go the shortest way around
                if delta_angle > Units.Pi then
                    delta_angle := delta_angle - ( 2.0 * Units.Pi );
```

-continued

```
                    elsif delta_angle < (0.0 - Units.Pi ) then
                        delta_angle := delta_angle + ( 2.0 * Units.Pi );
                    end if;
                    Auto_Z_Delta := (delta_angle)/40.0; -- 2 sec @ 20 Hz
                    cum_auto_angle_delta := 0.0;
                    target_auto_angle_delta := delta_angle;
                    Map_Ctr_In_Crs.Is_Set := True;
                    Map_Ctr_In_Crs.Value := new_crs;
                else -- first in course
                    Map_Ctr_In_Crs.Value := new_crs;
                    Map_Ctr_In_Crs.Is_Set := True;
                    if auto_angle_mode = Profile_View then
                        Set_Z_Rot_Angle_Profile_Relative;
                    elsif auto_angle_mode = Shoulder_View then
                        Set_Z_Rot_Angle_Shoulder_View_Relative;
                    end if;
                end if;
                Draw_3d.Set_Rot_Angle_Data(  Rot_X => Angle_3d_About_X,
                                             Rot_Z => Angle_3d_About_Z);
            end if;
            Map_Ctr_In_Crs.Is_Set := True;
            Map_Ctr_In_Crs.Value := new_crs;
            Last_In_Crs := new_crs;
        end Set_Map_Ctr_In_Crs;
THIS PROCEDURE DRAWS DIRECTION ARROWS ON A 3D DISPLAY AVOIDING THE
PROBLEMS OF VIEWING ARROWS FROM IN FRONT AND BEHIND BY USING THE FACT THAT
IN THOSE CASES, THE 3D LINE LENGTH WILL BE SHORT. FURTHER, A FIXED SIZE
ARROW HEAD CAN BE USED WITHOUT LOSS OF 3D EFFECT WITH THIS ALGORITHM.
--|.................................................................................................................................
        procedure Line_3D_Direction_Arrow(
                            Win       : in Windows.Window_Type;
                            From_x    : in Windows.Pixel_Count_Type;
                            From_y    : in WIndows.Pixel_Count_Type;
                            To_x      : in WIndows.Pixel_Count_Type;
                            To_y      : in WIndows.Pixel_Count_Type;
                            center_x  : in WIndows.Pixel_Count_Type;
                            center_y  : in Windows.Pixel_Count_Type
                            ) is
--|
--|  if line length > Q then draw a direction arrow in the midpoint of the
--|  line pointing to the To point.
--|
--|.................................................................................................................................
            x_del        : Float;
            y_del        : Float;
            y_over_x     : Float;
            line_len     : Float;
            mid_pt_x     : Windows.Pixel_Count_Type;
            mid_pt_y     : WIndows.Pixel_Count_Type;
            Rot_Pos_x    : Windows.Pixel_Count_Type;
            Rot_Pos_y    : Windows.Pixel_Count_Type;
            Pos_x        : Windows.Pixel_Count_Type;
            Pos_Y        : WIndows.Pixel_Count_Type;
            Sin_Rot_Ang  : Float;
            Cos_Rot_Ang  : Float;
            a            : Units.Radians;
            tsin         : float;
            tcos         : float;
            subtype Points_Array_3 is Windows.Vector_of_Point_Type(1..3);
            Arrow_Head   : Points_Array_3;
        begin
            -- determine line length
            x_del := Float(To_X - From_X);
            y_del := Float(To_Y - From_Y);
            line_len := Sqrt ( x_del*x_Del + y_del*y_del );
            if ( line_len > 50.0 ) then -- show an arrow
                sin_Rot_Ang := x_del/line_len;
                cos_rot_ang := -1.0 * (y_del/line_len);
                    -- determine mid-point position
                    mid_pt_x := From_X + Windows.Pixel_Count_Type(x_del/2.0);
                    mid_pt_y := From_Y + Windows.Pixel_Count_Type(y_del/2.0);
                    --
                    --   draw the direction arrow
                    --          Point3
                    --              .
                    --               . .
                    --                 . .
                    --                   .......
                    --       Point1    Point2
                    Pos_X := -3;
```

-continued

```
                    Pos_Y := 0;
                    Rot_Pos_X := Windows.Pixel_Count_Type(
                                (Float(Pos_X) * Cos_Rot_Ang) -
                                (Float(Pos_Y) * Sin_Rot_Ang)
                                            );
                    Rot_Pos_Y := Windows.Pixel_Count_Type(
                                (Float(Pos_X) * Sin_Rot_Ang) +
                                (Float(Pos_Y) * Cos_Rot_Ang)
                                            );
                    Arrow_Head(1).X := mid_pt_X + Rot_Pos_X + center_x;
                    Arrow_Head(1).Y := mid_pt_Y + Rot_Pos_Y + center_y;
                    Pos_X := 3;
                    Pos_Y := 0;
                    Rot_Pos_X := Windows.Pixel_Count_Type(
                                (Float(Pos_X) * Cos_Rot_Ang) -
                                (Float(Pos_Y) * Sin_Rot_Ang)
                                            );
                    Rot_Pos_Y := Windows.Pixel_Count_Type(
                                (Float(Pos_X) * Sin_Rot_Ang) +
                                (Float(Pos_Y) * Cos_Rot_Ang)
                                            );
                    Arrow_Head(2).X := mid_pt_X + Rot_Pos_X + center_x;
                    Arrow_Head(2).Y := mid_pt_Y + Rot_Pos_Y + center_y;
                    Pos_X := 0;
                    Pos_Y := -10;
                    Rot_Pos_X := Windows.Pixel_Count_Type(
                                (Float(Pos_X) * Cos_Rot_Ang) -
                                (Float(Pox_Y) * Sin_Rot_Ang)
                                            );
                    Rot_Pos_Y := Windows.Pixel_Count_Type(
                                (Float(Pos_X) * Sin_Rot_Ang) +
                                (Float(Pos_Y) * Cos_Rot_Ang)
                                            );
                    Arrow_Head(3).X := Mid_pt_X + Rot_Pos_X + center_x;
                    Arrow_Head(3).Y := mid_pt_Y + Rot_Pos_Y + center_y;
                    if Do_Draw_3d then
                        Fill_Polygon (Win, GC_Array(GREEN),
                                    Arrow_Head, Windows.CONVEX, Windows.ORIGIN);
                    end if;
             end if;
    end Line_3d_Direction_Arrow;
THESE ROUTINES PERFORM THE BASIC TRANSFORMATIONS OF THE 3D PLAN MAP BASED ON
THE CURRENT ROTATION ANGLES:
        XFORM_SCREEN_UNITS    TRANSFORMS POINTS THAT ARE IN SCREEN UNITS
        XFORM_LAT_LONG        TRANSFORMS POINTS THAT ARE IN LATITUDE,LONGITUDE
        XFORM_FORWARD_FACING_SCREEN_UNITS
                              DOES A TRANSFORMATION THAT CORRECTLY POSITIONS
                              A POINT SUCH THAT AN OBJECT COMPOSED OF SUCH
                              POINTS FACES FORWARD ON THE SCREEN FOR ANY
                              ROTATION ANGLES (SUCH AS TRIANGLES USED WITH
                              ALTITUDE LINES)
--|............................................................................................................
    procedure xform_screen_units (
        x_in : in Windows.Pixel_Count_Type;
        y_in : in Windows.Pixel_Count_Type;
        rot_z_in : in Units.Radians;
        rot_x_in : in Units.Radians;
        display_center_x_in : in Windows.Pixel_Count_Type;
        display_center_y_in : in Windows.Pixel_Count_Type;
        alt_in : in float                            := Current_Altitude_3d; -- feet
        vertical_scale_factor_in : in long_float    := Cur_Vert_Scale_3d;
        x_out : out Windows.Pixel_Count_Type;
        y_out : out Windows.Pixel_Count_Type) is
--|
--|  This procedure does the transformation for the 3D Plan Map.
--|
--|  NOTES:
--|      FOR x AND y IN SCREEN UNITS RELATIVE TO THE ORIGIN, NOT SCREEN CENTER
--|          (So, subtract screen center coordinates if relative to them)
--|............................................................................................................
    x, y, rot_z, rot_x, display_center_x, display_center_y : float;
    alt, vertical_scale_factor : float;
    xp, yp : float;
    begin
        x := float(x_in);
        y := float(y_in);
        rot_z := float(rot_z_in);
        rot_x := float(rot_x_in);
        display_center_x := float(display_center_x_in);
        display_center_y := float(display_center_y_in);
```

```
            alt := float(alt_in);
            vertical_scale_factor := float(vertical_scale_factor_in);
                xp :=  x * Cos(rot_z) +
                       y * Sin(rot_z) +
                       display_center_x;
                yp :=  x * (-Sin(rot_z)) * Cos(rot_x) +
                       y * Cos(rot_z) * Cos(rot_x) +
                       alt * vertical_scale_factor * (-Sin(rot_x)) +
                       display_center_y;
                x_out := Windows.Pixel_Count_Type( xp );
                y_out := Windows.Pixel_Count_Type( yp );
        end xform_screen_units;
--|...............................................................................................................................................
        procedure xform_lat_long (
                lat_in                      : in long_float;
                long_in                     : in long_float;
                ref_lat_in                  : in long_float;
                ref_long_in                 : in long_float;
                map_scale_factor_in         : float;
                rot_z_in                    : in Units.Radians;
                rot_x_in                    : in Units.Radians;
                display_center_x_in         : in Windows.Pixel_Count_Type;
                display_center_y_in         : in Windows.Pixel_Count_Type;
                alt_in                      : in float := Current_Altitude_3d; -- feet
                vertical_scale_factor_in    : in long_float := Cur_Vert_Scale_3d;
                x_out                       : out Windows.Pixel_Count_Type;
                y_out                       : out Windows.Pixel_Count_Type) is
--|
--| This routine performs the transformation for the 3D Plan Map
--| including the tangent plane projection of latitude and longitude.
--|...............................................................................................................................................
        map_scale_factor : long_float;
        x, y : long_float;
        xp, yp : Windows.Pixel_Count_Type;
        EARTH_RADIUS : long_float := 3444.3295;
        begin
            map_scale_factor := long_float( map_scale_factor_in );
                x := EARTH_RADIUS * Cos(lat_in) * Sin(long_in - ref_long_in);
                y := (-EARTH_RADIUS) *
                                (    Sin(lat_in) * Cos(ref_lat_in) -
                                     Cos(lat_in) * Sin(ref_lat_in) * Cos(long_in - ref_long_in)
                                );
                xp := Windows.Pixel_Count_Type( x * map_scale_factor ) ;
                yp := Windows.Pixel_Count_Type( y * map_scale_factor ) ;
                -- x and y are now in screen units relative to the window origin
                --      so do same as previous procedure
                xform_screen_units (
                        x_in => xp,                                     --: inWindows.Pixel_Count
                        y_in => yp ,                                    --: inWindows.Pixel_Count
                        rot_z_in => rot_z_in,                           --: in Units.Radians;
                        rot_x_in => rot_x_in,                           --: in Units.Radians;
                        display_center_x_in => display_center_x_in,     --: inWindows.Pixel_Count
                        display_center_y_in => display_center_y_in,     --: inWindows.Pixel_Count
                        alt_in => alt_in,                               --: in float Feet;
                        vertical_scale_factor_in => vertical_scale_factor_in, --: in float;
                        x_out => x_out,                                 --: outWindows.Pixel_Count
                        y_out => y_out                                  --: outWindows.Pixel_Count
                        );
        end xform_lat_long;
--|...............................................................................................................................................
        procedure xform_forward_facing_screen_units(
                symbol_center_x_in : in Windows.Pixel_Count_Type;
                symbol_center_y_in : in Windows.Pixel_Count_Type;
                x_in : in Windows.Pixel_Count_Type;
                y_in : in Windows.Pixel_Count_Type;
                rot_z_in : in Units.Radians;
                rot_x_in : in Units.Radians;
                display_center_x_in : in Windows.Pixel_Count_Type;
                display_center_y_in : in Windows.Pixel_Count_Type;
                alt_in : in float                    := Current_Altitude_3d; -- feet
                vertical_scale_factor_in : in long_float   := Cur_Vert_Scale_3d;
                x_out : out Windows.Pixel_Count_Type;
                y_out : out Windows.Pixel_Count_Type) is
--|
--| This procedure performs the transformation for graphic items which
--| always are to face forward on the display.
--|...............................................................................................................................................
        x, y, rot_z, rot_x, display_center_x, display_center_y : float;
        alt, vertical_scale_factor, symbol_center_x, symbol_center_y : float;
        x_pre_rot, y_pre_rot : float;
```

```
   x_pre_rot_su, y_pre_rot_su : Windows.Pixel_Count_Type;
   xp, yp : float;
   begin
        x := float(x_in);
        y := float(y_in);
        rot_z := float(rot_z_in);
        rot_x := float(rot_x_in);
        display_center_x := float(display_center_x_in);
        display_center_y := float(display_center_y_in);
        symbol_center_x := float( symbol_center_x_in );
        symbol_center_y := float( symbol_center_y_in );
             -- pre-rotate about origin in opposite direction of z rotation
             x_pre_rot :=
                      (x - symbol_center_x + display_center_x) * Cos(rot_z) +
                      (y - symbol_center_y + display_center_y) * (-Sin(rot_z));
             y_pre_rot :=
                      (x - symbol_center_x + display_center_x) * Sin(rot_z) +
                      (y - symbol_center_y + display_center_y) * Cos(rot_z);
             -- move symbol back
             x_pre_rot := x_pre_rot + symbol_center_x - display_center_x;
             y_pre_rot := y_pre_rot + symbol_center_y - display_center_y;
             x_pre_rot_su := Windows.Pixel_Count_Type( x_pre_rot );
             y_pre_rot_su := Windows.Pixel_Count_Type( y_pre_rot );
             -- transform as usual
             xform_screen_units (
                      x_in => x_pre_rot_su,                             --: inWindows.Pixel_Count
                      y_in => y_pre_rot_su ,                            --: inWindows.Pixel_Count
                      rot_z_in => rot_z_in,                             --: in Units.Radians;
                      rot_x_in => rot_x_in,                             --: in Units.Radians;
                      display_center_x_in => display_center_x_in,       --: inWindows.Pixel_Count
                      display_center_y_in => display_center_y_in,       --: inWindows.Pixel_Count
                      alt_in => alt_in,                                 --: in float Feet;
                      vertical_scale_factor_in => vertical_scale_factor_in, --: in float;
                      x_out => x_out,                                   --: outWindows.Pixel_Count
                      y_out => y_out                                    --: outWindows.Pixel_Count
                      );
   end xform_forward_facing_screen_units;
```

We claim:

1. A flight management system for an aircraft, comprising:
   means for inputting flight plan information;
   means for calculating a flight plan;
   means for generating a graphical representation of the flight plan wherein said graphical representation is three-dimensional and is automatically adjusted as a flight progresses while simultaneously maintaining a preset viewing direction relative to the aircraft.

2. A flight management system for an aircraft, comprising:
   a flight management system computer;
   a control display unit operably coupled to the flight management system computer;
   a display unit operably coupled to the flight management system computer for generating and displaying a graphical representation of a flight plan wherein said graphical representation is three-dimensional and is automatically adjusted as a flight progresses while simultaneously maintaining a preset viewing direction relative to the aircraft.

3. A method for displaying flight management information comprising a graphical representation of a flight plan of an aircraft, comprising the steps of:
   providing flight plan information;
   calculating a flight path;
   displaying a three-dimensional representation of air space, said three-dimensional representation of air space oriented according to a preset viewing direction relative to the aircraft;
   displaying said flight path within said three-dimensional display of air space; and
   automatically adjusting the display as a flight progresses so as to maintain said preset viewing direction relative to the aircraft.

4. A flight management system, comprising:
   a flight management system computer;
   a control display unit operably coupled to the flight management system computer;
   a display unit for displaying flight plan information within a viewing area on a video display, wherein the resolution of a vertical dimension on the display depicting altitude is automatically adjusted according to flight plan altitude details to be displayed within said viewing area, comprising:
   means for reading said flight plan information;
   means for generating and displaying a pictorial representation of a flight plan, said pictorial representation comprising a flight path displayed relative to a vertical scale depicting altitude; and
   means for automatically adjusting the resolution of the vertical scale so that the resolution of the vertical scale varies inversely with the maximum altitude of the flight path to be displayed within the viewing area of the display.

5. A flight management system of claim 4, wherein the resolution of the vertical scale is adjusted to be as great as possible and still shows the highest point of the flight path to be displayed within the viewing area of the display.

6. A flight management system of claim 4, wherein said pictorial representation comprising said flight path is further displayed relative to a pictorial representation of three-dimensional air space.

7. A flight management system of claim 4, wherein said pictorial representation comprising said flight path is further displayed relative to a horizontal scale depicting horizontal distance relative to a reference axis.

8. In a flight management system, a display system for displaying flight plan information within a viewing area on a video display, wherein the resolution of the vertical scale depicting altitude is dynamically adjusted according to flight plan altitude details to be displayed within said viewing area, comprising:

means for reading said flight plan information;

means for generating and displaying a pictorial representation of a flight plan, said pictorial representation comprising a flight path displayed relative to a vertical scale depicting altitude; and     means for automatically adjusting the resolution of the vertical scale so that the resolution of the vertical scale varies inversely with the maximum altitude of the flight path to be displayed within the viewing area of the display.

9. A display system of claim 8, wherein the resolution of the vertical scale is adjusted to be as great as possible and still shows the highest point of the flight path to be displayed within the viewing area of the display.

10. A display system of claim 8, wherein said pictorial representation comprising said flight path is further displayed relative to a pictorial representation of three-dimensional air space.

11. A display system of claim 8, wherein said pictorial representation comprising said flight path is further displayed relative to a horizontal scale depicting horizontal distance relative to a reference axis.

12. A method for displaying flight management information comprising a graphical representation of a flight plan of an aircraft, comprising the steps of:

providing flight plan information;

calculating a flight path;

displaying a pictorial representation of a flight plan, said pictorial representation comprising a flight path displayed in relation to a vertical scale depicting altitude; and     automatically adjusting the resolution of the vertical scale so that the resolution of the vertical scale varies inversely with the maximum altitude of the flight path to be displayed within the viewing area of the display.

13. A method of claim 12, wherein the resolution of the vertical scale is adjusted to be as great as possible and still shows the highest point of the flight path to be displayed within the viewing area of the display.

14. A method of claim 12, wherein said pictorial representation comprising said flight path is further displayed relative to a pictorial representation of three-dimensional air space.

15. A method of claim 12, wherein said pictorial representation comprising said flight path is further displayed relative to a horizontal scale depicting horizontal distance relative to a reference axis.

* * * * *